United States Patent [19]

West et al.

[11] Patent Number: 4,920,570

[45] Date of Patent: Apr. 24, 1990

[54] MODULAR ASSISTIVE LISTENING SYSTEM

[76] Inventors: Henry L. West, 169 Rosemont Dr., Rochester, N.Y. 14617; Joseph D. Kozelsky, 1214 Gerrads Cross, Webster, N.Y. 14580

[21] Appl. No.: 134,829

[22] Filed: Dec. 18, 1987

[51] Int. Cl.[5] ........................ H04R 25/00; H04B 5/00

[52] U.S. Cl. ........................................ 381/68; 381/79; 381/81; 455/11; 340/825.72

[58] Field of Search ...................... 340/825.44, 825.72, 340/825.69, 825.54; 455/11, 41, 89, 100; 379/55, 56, 52; 381/68, 80, 81, 72, 74, 85, 82, 151, 79

[56] References Cited

U.S. PATENT DOCUMENTS

| | | | |
|---|---|---|---|
| 3,122,847 | 3/1964 | Redfield et al. | 455/57 |
| 3,875,349 | 4/1975 | Ruegg | 381/123 |
| 4,061,875 | 12/1977 | Freifeld et al. | 381/72 |
| 4,061,972 | 12/1977 | Burgess | 455/41 |
| 4,150,334 | 4/1979 | Williams | 455/11 |
| 4,187,413 | 2/1980 | Moser | 381/68 |
| 4,259,547 | 3/1981 | Valley et al. | 381/23.1 |
| 4,289,935 | 9/1981 | Zollner et al. | 128/420.6 |
| 4,334,315 | 6/1982 | One et al. | 455/41 |
| 4,403,118 | 9/1983 | Zollner et al. | 128/420.5 |
| 4,428,377 | 1/1984 | Zollner | 128/420.6 |
| 4,435,845 | 3/1984 | Timm et al. | 381/123 |
| 4,472,603 | 9/1984 | Berg | 381/69.2 |
| 4,508,940 | 4/1985 | Steeger | 381/68.2 |
| 4,539,439 | 9/1985 | Strothmann et al. | 381/68 |
| 4,575,586 | 3/1986 | Topholm | 73/585 |
| 4,622,440 | 11/1986 | Slavin | 381/68.1 |
| 4,633,498 | 12/1986 | Warnke et al. | 381/74 |
| 4,689,820 | 8/1987 | Köpke et al. | 381/68 |

FOREIGN PATENT DOCUMENTS

| | | |
|---|---|---|
| 3127670 | 7/1981 | Fed. Rep. of Germany . |
| 3431584 | 8/1984 | Fed. Rep. of Germany . |
| 3527112 | 7/1985 | Fed. Rep. of Germany . |

OTHER PUBLICATIONS

Herbert P. Wolf and Thomas A. Powers, "Remote control: The Invisible Touch", The Hearing Journal, (Aug. 1986) pp. 18–20.

James L. Pehringer, "Insights Into the Application and Marketing of ALDs"; Management/Marketing, Reprinted from Hearing Instruments, vol. 37, No. 7, 1986.

*Primary Examiner*—Reinhard J. Eisenzopf
*Assistant Examiner*—Curtis A. Kuntz
*Attorney, Agent, or Firm*—Lowe, Price, LeBlanc, Becker & Shur

[57] ABSTRACT

A modular assistive listening system is disclosed that employs a hand-held switching/control module to select one or more of the signals transmitted from a plurality of remote input modules. The selected signal is then transmitted to an earphone module that converts the selected signal to audible sound. The hand-held switching/control module permits a hearing impaired person to easily select desire input modules while permitting unrestricted movement by the use of wireless transmission from the switching/control module to the earphone module.

11 Claims, 3 Drawing Sheets

MODULAR ASSISTIVE LISTENING SYSTEM

BACKGROUND OF THE INVENTION

The invention is related to the field of hearing aid devices. More particularly, the invention relates to assistive listening devices that bring sound from remote locations directly to the ear to improve signal-to-noise response.

Conventional hearing aids consisting of an integral microphone, amplifier and earphone worn within or partially behind the ear, are based on the principal of providing amplified sound to the hearing impaired individual. Typical hearing aids, however, provide little benefit to individuals having specific hearing difficulties related to distinguishing intelligible sounds from ambient noise conditions. In conditions such as a noisy crowded room, group discussions, and telephone conversations, the hearing aid amplifies the background noise as well as the sounds from the source of interest to the user, the result being unintelligible noise.

In order to overcome the deficiencies of conventional hearing aids, assistive listening devices have been developed that bring signals directly from the source of interest to the ear of the hearing impaired individual. The most common assistive listening device is the telecoil (T-coil) that picks up the electrical fields generated from a telephone receiver and converts the fields to signals supplied directly to the amplifier of the hearing aid. In some cases, the T-coil is incorporated directly into the body of the hearing aid. Other assistive listening devices include the use of microphones that are placed in close proximity to the source of interest, for example a television, and are directly connected to the circuitry of the hearing aid.

The use of assistive listening devices in conjunction with a hearing aid requires that a switching mechanism be provided for switching between the integral microphone of hearing aid and the assistive listening device. This has presented a problem in conventional hearing aids which have been miniaturized in order to reduce their visibility, namely, the switching adjustment controls provided on the hearing aids are so small that they require a good deal of manual dexterity. Also, assistive listening devices that require physical electrical connections between the assistive device and the hearing aid severely limit the users mobility and are very conspicuous. Further, the number of assistive listening devices that can be utilized with the hearing aid is restricted, as they tend to work individually and cannot be combined. Furthermore, emergency messages or other public announcements are not well perceived by the hearing impaired with conventional devices.

SUMMARY OF THE INVENTION

An object of the invention is to provide an assistive listening system for the hearing impaired that permits the user to easily switch between a variety of assistive listening devices.

A further object of the invention is to provide an assistive listening system of a modular design so that the number and composition of the assistive listening devices employed in the system may be readily varied.

Another object of the invention is to provide an assistive listening system having a priority feature that permits a signal received from a high priority assistive listening device to override lower priority signals.

A still further object of the invention is to provide an assistive listening system of a modular design that permits unrestricted movement of the user by the use of "dual wireless transmission".

These and other objects are achieved by a modular assistive listening system accommodating a plurality of remote input modules for wireless transmission of a sound indicative signal; a switching/control module for receiving the signals transmitted from said plurality of remote input modules and selectively choosing one or more of the signals transmitted from the plurality of remote input modules to form a selected signal, said switching/control module transmitting said selected signal via a wireless transmission link; and an earphone module for receiving the selected signal transmitted by the switching/control module and reproducing the selected signal as audible sound.

BRIEF DESCRIPTION OF THE DRAWINGS

With the above as background, reference should now be made to the following figures in connection with the detailed description of the invention in which.

DETAILED DESCRIPTION OF THE PREFERRED EMBODIMENTS

Figure 1:
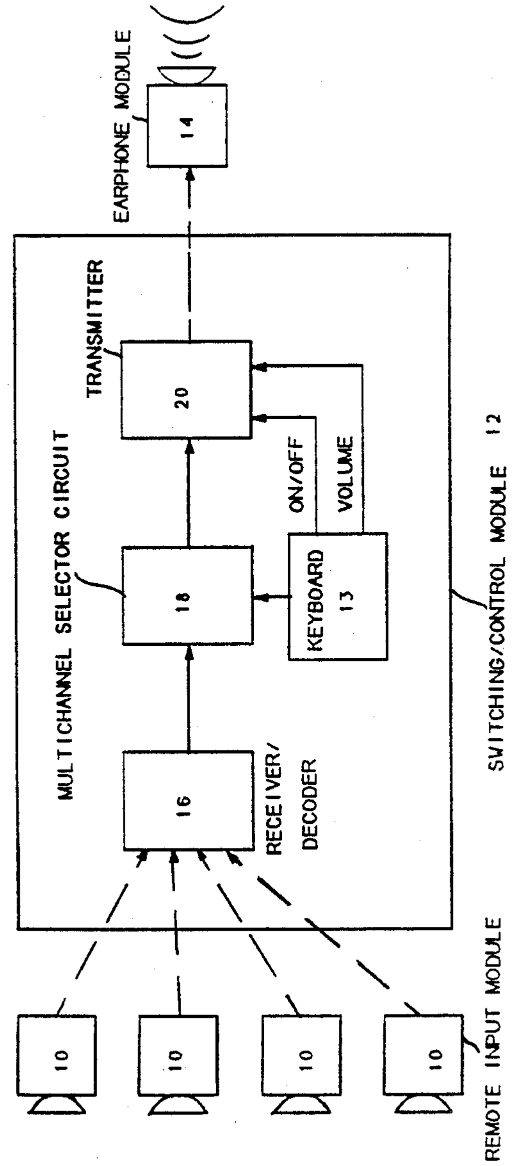
FIG. 1 is a block diagram of a first embodiment of an assistive listening system according to the present invention.

Referring now to FIG. 1, an assistive listening system according to the instant invention is shown accommodating a plurality of remote input modules 10, a hand-held switching/control module 12, and an earphone module 14. The remote input modules 10 may include, for example, remote microphone/transmitters for placement near televisions and radios, a doorbell or phonebell transducer and transmitter, and a transmitter coupled to a public address (PA) system at an airport, school or other location with the transmitter preferably operating on a generally accepted assigned frequency or assigned coding system to transmit emergency or priority information. Many other input modules other than those listed above are of course possible.

Each of the remote input modules 10 transmits a signal, either in analog or digital form, to the switching/control module 12. Preferably, radio frequency communication is utilized between the remote input modules 10 and the switching/control module 12 utilizing specially assigned frequency bands that have been assigned for use with hearing assistive devices. In North America, the frequency band between 72 to 76 Mhz has been assigned for this purpose. Alternatively, ultrasonic, infrared or inductive transmission links may be employed for transmission between the remote input modules 10 and the switching/control module 12. Each of the remote input modules 10 may be assigned a particular frequency, or known coding techniques may be employed, in order to distinguish the signals transmitted from each module.

The switching/control module 12 is provided with a receiver/decoder 16 that receives and decodes the signals transmitted by the remote input modules 10. The decoded signals from the receiver/decoder 16 are then provided to a multichannel selector circuit 18 that permits a user to select, via a control panel having a selector device such as a keyboard 13, one or more signals from the remote input modules 10 that are to be supplied to a transmitter 20. The transmitter 20 then transmits the selected signals to the earphone module 14 that is provided at the users ear. Activation (ON/OFF) and volume control signals are provided to the transmitter 20 via the keyboard 13. As the switching/control module 12 is a hand-held unit, large selection buttons may be provided on the keyboard 13 to enable an elderly or physically impaired individual to easily select the desired remote input modules 10.

As described above, the present invention employs dual wireless transmission, i.e., a wireless link between the plurality of remote input modules 10 to the switching/control module 12 and a wireless link between the switching/control module 12 and the earphone module 14, thereby permitting unrestricted movement of the user of the system.

Figure 2:
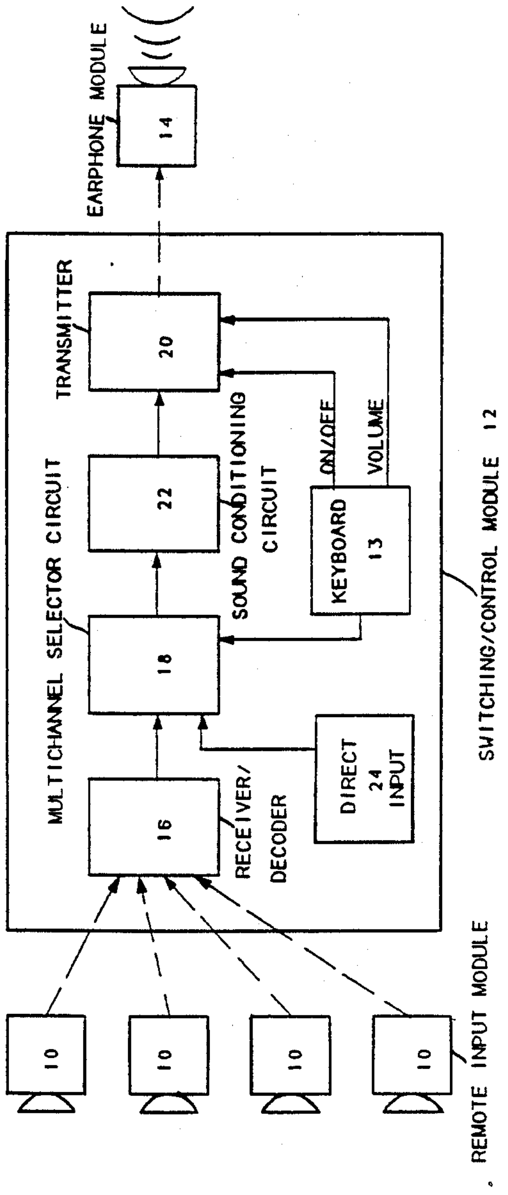
FIG. 2 is a block diagram of a second embodiment of an assistive listening system according to the present invention.

As shown in FIG. 2, a second embodiment of the invention is shown in which the hand-held switching-/control unit 12 is also provided with sound conditioning circuitry 22 that may employ one or more of a variety of conventional signal enhancement processing techniques, such as analog filtering and/or digital phonetic reshaping of sound and noise suppression by pattern recognition, to the signal to be transmitted by the transmitter 20. The sound conditioning circuitry 22 need not be miniaturized as would be required for placement in the body of a conventional hearing aid, as it is located in the hand-held switching/control module 12, thereby permitting less costly conventional components to be utilized in the system. The sound conditioning circuit could be implemented digitally as a fixed program, or could be contained in a customized ROM for ease of installation or replacement, or it could be a unit containing several sound processing sections which are user selectable via the switching/control unit 12, or a microprocessor with artificial intelligence to self-select from several sound processing sections based on the characteristics of the sound input.

The embodiment illustrated in FIG. 2 further provides direct inputs 24 in the body of the switching/control module 12. The direct inputs 24 are connected to the multichannel selector circuit 18 and may take the form, for example, of a T-coil or a microphone. The T-coil can be used to pick up transmissions from an emission loop located in a room such as a lecture hall. The microphone can be used to provide background sound if desired or to permit another individual to speak directly by use of the switching control module 12, to the user of the listening system during a conversation. The direct inputs 24 may also take the form of audio jacks for direct input of music from a cassette player or the like.

Figure 3:
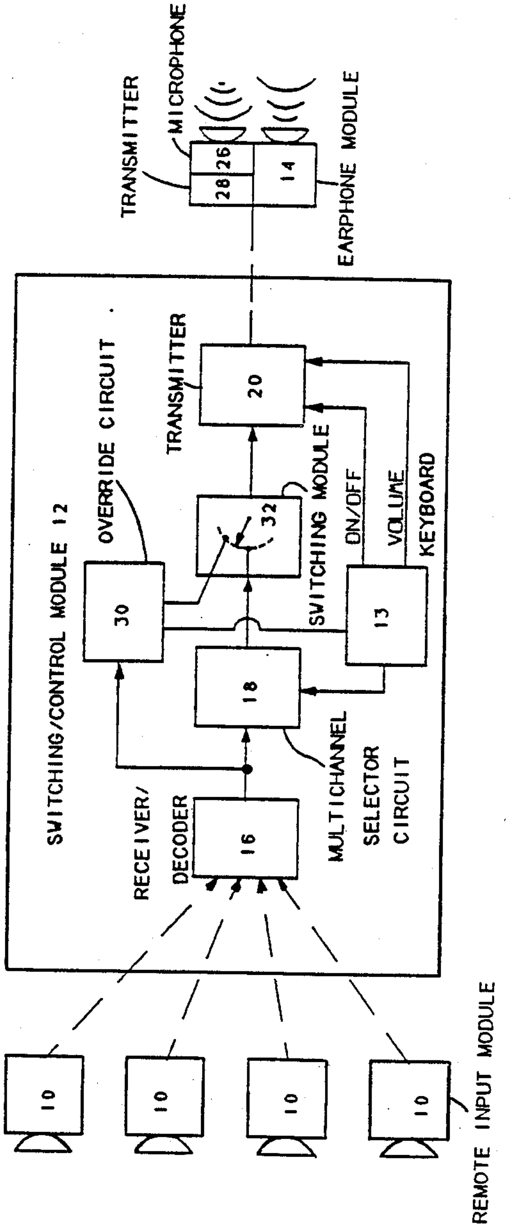
FIG. 3 is a block diagram of a third embodiment of an assistive listening system according to the present invention.

A third embodiment of the invention is shown in FIG. 3. In this embodiment, the earphone module 14 also includes a microphone 26 and transmitter 28. The microphone 26 and transmitter 28 act as another remote input and transmits the sound present at the users ears back to the switching/control module 12. The user may then select the signal received from the transmitter 28 as one of the desired remote inputs.

The third embodiment also provides an override circuit 30 that is activated by an input unit employing a preassigned frequency or coding technique for emergency or priority transmission. This signal bypasses the normal selector function of the keyboard 13 and the selector circuit 18 and is fed directly to the transmitter 20. During this time, the previous signal is either reduced or shut off. The new signal, however, can be temporarily interrupted by the user as shown by the line from the keyboard 13 to the override circuit 30. Furthermore, it is also feasible within the scope of the invention to assign a subsidiary user-selected priority via keyboard 13 to other input channels by means of commonly known techniques. The override circuit 30 may employ conventional voice activation techniques to remain in a low power standby condition until the priority signal is detected.

The above-described priority feature is particularly important in an embodiment of the invention in which at least one of the remote input units comprises a PA system including an FM transmitter. The FM transmitter would transmit emergency or priority information to the hearing impaired in public locations.

Although the invention has been described with particular reference to certain preferred embodiments thereof, modifications and variations may be effected within the spirit and scope of the invention. For example, a wide variety of input sources may be employed as remote input modules 10 and the direct inputs 24 other than those listed above. Further, the above-described embodiments may be realized utilizing discrete circuits or a microprocessor to perform the indicated functions.

What is claimed is:

1. A modular assistive listening system comprising:

a. a plurality of remote input modules for wireless transmission of a signal;

b. a hand-held switching/control module for receiving the signals transmitted from said plurality of remote input modules and selecting one or more of the signals transmitted from the plurality of remote input modules to form a selected signal, said switching/control module transmitting said selected signal via wireless transmission, wherein said hand-held switching/control module comprises a receiver/decoder circuit, a multichannel selector circuit coupled to said receiver/decoder circuit, a transmitter coupled to said multichannel selector circuit, and an override circuit coupled to said receiver/decoder circuit and said transmitter; and c. an earphone module for receiving the selected signal transmitted by said switching/control module and reproducing the selected signal as audible sound.

2. A modular assistive listening system as claimed in claim 1, wherein said hand-held switching/control module comprises a plurality of direct input modules for receiving direct input signals that are selectively provided in the selected signal.

3. A modular assistive listening system as claimed in claim 1, wherein said earphone module comprises a microphone/transmitter unit having an output signal indicative of sound present at a users ear that is provided to said switching/control module so that the output signal from said microphone/transmitter unit may be selectively provided in the selected signal which is transmitted back to said earphone module.

4. A modular assistive listening system as claimed in claim 1, wherein said hand-held switching/control module further comprises sound conditioning circuitry coupled between said multichannel selector circuit and said transmitter.

5. A modular assistive listening system as claimed in claim 1, wherein at least one of said remote input units comprises a transmitter coupled to a public address system.

6. An apparatus comprising:
a. a plurality of wireless transmission means for transmitting a plurality of sound indicative signals from a plurality of remote locations;
b. selection means configured as a hand-held unit for receiving and selecting one or more of said plurality of sound indicative signals to form a selected signal, said selection means including manual selection means for manually selecting one or more of said plurality of sound indicative signals to form said selected signal and wireless transmission means for transmitting said selected signal; and
c. reception means for receiving the selected signal transmitted from said selection means and converting said selected signal to an audible sound, wherein said reception means includes a microphone/transmission means for transmitting a sound signal indicative of sound present at a users ear to said selection means, said selection means selectively providing the sound indicative signal from said microphone/transmission means in said selected signal.

7. An apparatus comprising:
a. a plurality of wireless transmission means for transmitting a plurality of sound indicative signals from a plurality of remote locations;
b. selection means configured as a hand-held unit for receiving and selecting one or more of said plurality of sound indicative signals to form a selected signal, said selection means including manual selection means for manually selecting one or more of said plurality of sound indicative signals to form said selected signal and wireless transmission means for transmitting said selected signal; and
c. reception means for receiving the selected signal transmitted from said selection means and converting said selected signal to an audible sound;

wherein said selection means comprises an override circuit means for receiving a priority signal from one of said plurality of wireless transmission means designated by said manual selection means and providing said priority signal to said wireless transmission means.

8. An apparatus comprising:
a. a plurality of wireless transmission means for transmitting a plurality of sound indicative signals from a plurality of remote locations;
b. selection means configured as a hand-held unit for receiving and selecting one or more of said plurality of sound indicative signals to form a selected signal, said selection means including manual selection means for manually selecting one or more of said plurality of sound indicative signals to form said selected signal and wireless transmission means for transmitting said selected signal; and
c. reception means for receiving the selected signal transmitted from said selection means and converting said selected signal to an audible sound;

wherein said selection means further comprises sound conditioning means for performing sound conditioning of said selected signal.

9. An apparatus comprising:
a. a plurality of wireless transmission means for transmitting a plurality of sound indicative signals from a plurality of remote locations;
b. selection means configured as a hand-held unit for receiving and selecting one or more of said plurality of sound indicative signals to form a selected signal, said selection means including manual selection means for manually selecting one or more of said plurality of sound indicative signals to form said selected signal and wireless transmission means for transmitting said selected signal; and
c. reception means for receiving the selected signal transmitted from said selection means and converting said selected signal to an audible sound;

wherein at least one of said plurality of wireless transmission means comprises a transmitter coupled to a public address system.

10. A modular assistive listening system comprising:
a. a plurality of remote input modules for wireless transmission of a signal;
b. a hand-held switching/control module for receiving the signals transmitted from said plurality of remote input modules and selecting one or more of the signals transmitted from the plurality of remote input modules to form a selected signal, said switching/control module transmitting said selected signal via wireless transmission; and
c. an earphone module for receiving the selected signal transmitted by said switching/control module and reproducing the selected signal as audible sound, wherein said earphone module comprises a microphone/transmitter unit having an output signal indicative of sound present at a users ear that is provided to said switching/control module so that the output signal from said microphone/transmitter unit may be selectively provided in the selected signal which is transmitted back to said earphone module.

11. A modular assistive listening system as claimed in claim 10, wherein said switching/control module comprises a plurality of direct input modules for receiving direct input signals that are selectively provided in the selected signal.

* * * * *